(12) United States Patent
Jang

(10) Patent No.: US 9,884,616 B2
(45) Date of Patent: Feb. 6, 2018

(54) METHOD AND SYSTEM FOR CONTROLLING HYBRID VEHICLE

(71) Applicant: Hyundai Motor Company, Seoul (KR)

(72) Inventor: Hwa Yong Jang, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/924,982

(22) Filed: Oct. 28, 2015

(65) Prior Publication Data

US 2016/0368476 A1    Dec. 22, 2016

(30) Foreign Application Priority Data

Jun. 17, 2015    (KR) .......................... 10-2015-0086108

(51) Int. Cl.
*B60L 9/00*    (2006.01)
*B60L 1/00*    (2006.01)
(Continued)

(52) U.S. Cl.
CPC ......... *B60W 20/12* (2016.01); *F02D 41/0002* (2013.01); *B60W 2510/0628* (2013.01); (Continued)

(58) Field of Classification Search
CPC ......... F02D 2200/0812; F02D 41/0025; F02D 41/0087; F02D 41/0275; F02D 41/029; F02D 41/3076; F02D 29/02; F02D 41/0042; F02D 2250/08; F02D 2250/41; F02D 41/0002; F02D 2041/001; F02D 2200/0406; F02D 2200/0802; F02D 13/0203; B60W 2550/146; B60W 2550/22; B60W 2710/18; B60W 2710/207; B60W 2720/10; (Continued)

(56) References Cited

U.S. PATENT DOCUMENTS 7,198,123 B2 *    4/2007    Imazu ..................... B60K 6/365
                                                    180/65.25
7,960,928 B2 *    6/2011    Tang ..................... B60L 15/025
                                                    318/400.02
(Continued)

FOREIGN PATENT DOCUMENTS

JP    2000-314343 A    11/2000
JP    2006-070743 A    3/2006
(Continued)

*Primary Examiner* — Jelani Smith
*Assistant Examiner* — Luis A Martinez Borrero
(74) *Attorney, Agent, or Firm* — Mintz Levin Cohn Ferris Glovsky and Popeo, P.C.; Peter F. Corless

(57) ABSTRACT

A method and system for controlling a hybrid vehicle equipped with an air control valve are provided. The method includes collecting road information and determining a number of conversions between an engine operation mode and a motor driving mode based on the collected road information. Further, a degree of flap closing of the air control valve is restricted from being corrected when the predicted number of conversion is less than a predetermined threshold. The air control valve is adjusted for flap displacement upon closing of the flap when the predicted number of conversion is greater than the predetermined threshold and in which the degree of flap closing of the air control valve is corrected based on the detected flap displacement.

12 Claims, 1 Drawing Sheet

(51) Int. Cl.
- *G05D 1/00* (2006.01)
- *G05D 3/00* (2006.01)
- *G06F 17/00* (2006.01)
- *B60W 20/12* (2016.01)
- *F02D 41/00* (2006.01)

(52) U.S. Cl.
CPC . *B60W 2550/22* (2013.01); *F02D 2041/0022* (2013.01); *F02D 2200/701* (2013.01); *F02D 2200/702* (2013.01); *Y02T 10/42* (2013.01); *Y10S 903/902* (2013.01)

(58) Field of Classification Search
CPC ....... B60W 30/18145; B60W 50/0097; B60W 20/16; B60W 10/06; B60W 10/08; B60W 10/196; B60W 2540/10; B60W 2710/0616; B60W 30/18136; B60L 11/1862; B60L 2240/62; B60L 2250/10; B60L 2260/28; B60L 2270/145; B60L 11/123
USPC ....... 701/117, 22, 19, 408, 1, 119, 400, 412, 701/417, 528, 537, 93, 103, 105, 112, 36; 903/930, 902, 905, 907, 947, 903, 904, 903/906; 180/65.285, 65.29, 65.22, 180/65.23, 65.25

See application file for complete search history.

(56) References Cited

U.S. PATENT DOCUMENTS

| | | | | |
|---|---|---|---|---|
| 8,285,431 | B2 * | 10/2012 | Heap | B60K 6/365 |
| | | | | 180/65.21 |
| 8,290,682 | B2 * | 10/2012 | Ewert | B60K 6/445 |
| | | | | 701/22 |
| 9,416,739 | B2 * | 8/2016 | Jang | F02D 41/0002 |
| 9,425,474 | B2 * | 8/2016 | Ryu | H01M 8/04753 |
| 9,657,658 | B2 * | 5/2017 | Chun | B60W 20/17 |
| 2002/0062183 | A1 * | 5/2002 | Yamaguchi | B60K 6/46 |
| | | | | 701/22 |
| 2009/0299559 | A1 * | 12/2009 | Shimohira | B60K 1/02 |
| | | | | 701/22 |
| 2010/0062896 | A1 * | 3/2010 | Falkenstein | B60W 10/08 |
| | | | | 477/3 |
| 2010/0161166 | A1 * | 6/2010 | Yamada | B60K 6/46 |
| | | | | 701/22 |
| 2010/0305799 | A1 * | 12/2010 | Yamada | B60K 6/46 |
| | | | | 701/22 |
| 2011/0022259 | A1 * | 1/2011 | Niwa | B60K 6/365 |
| | | | | 701/22 |
| 2011/0191010 | A1 * | 8/2011 | Russ | F02M 26/00 |
| | | | | 701/108 |
| 2012/0123653 | A1 * | 5/2012 | Kimura | B60W 10/06 |
| | | | | 701/54 |
| 2013/0110383 | A1 * | 5/2013 | McDonald | F02D 41/042 |
| | | | | 701/113 |
| 2013/0116872 | A1 * | 5/2013 | Nakagawa | B60K 6/445 |
| | | | | 701/22 |
| 2013/0296121 | A1 * | 11/2013 | Gibson | F02D 41/022 |
| | | | | 477/5 |
| 2014/0156128 | A1 * | 6/2014 | Wake | B60L 1/003 |
| | | | | 701/22 |
| 2014/0172219 | A1 * | 6/2014 | Nakanishi | B60K 6/48 |
| | | | | 701/22 |
| 2014/0195092 | A1 * | 7/2014 | Saito | B60W 10/02 |
| | | | | 701/22 |
| 2014/0224225 | A1 * | 8/2014 | Kragh | F02M 25/0836 |
| | | | | 123/520 |
| 2015/0066265 | A1 * | 3/2015 | Martin | B60W 20/15 |
| | | | | 701/22 |
| 2015/0120108 | A1 * | 4/2015 | Dudar | F02M 25/089 |
| | | | | 701/22 |
| 2015/0121864 | A1 * | 5/2015 | Surnilla | F02D 41/0052 |
| | | | | 60/605.2 |
| 2015/0134173 | A1 * | 5/2015 | Choi | B60W 20/00 |
| | | | | 701/22 |
| 2015/0285161 | A1 * | 10/2015 | Ulrey | F02D 23/02 |
| | | | | 477/3 |
| 2015/0343893 | A1 * | 12/2015 | Nam | B60K 11/085 |
| | | | | 701/49 |
| 2016/0108830 | A1 * | 4/2016 | Jang | F02D 41/0002 |
| | | | | 701/22 |
| 2016/0108831 | A1 * | 4/2016 | Chun | B60W 20/17 |
| | | | | 701/22 |
| 2016/0319718 | A1 * | 11/2016 | Dudar | F02M 25/089 |

FOREIGN PATENT DOCUMENTS

| | | |
|---|---|---|
| JP | 2015-000685 A | 1/2015 |
| JP | 2015-080962 A | 4/2015 |
| KR | 2007-0064498 A | 6/2007 |
| KR | 10-0765636 B1 | 10/2007 |
| KR | 2008-0054284 A | 6/2008 |
| KR | 10-2016-0049697 A | 5/2016 |

\* cited by examiner

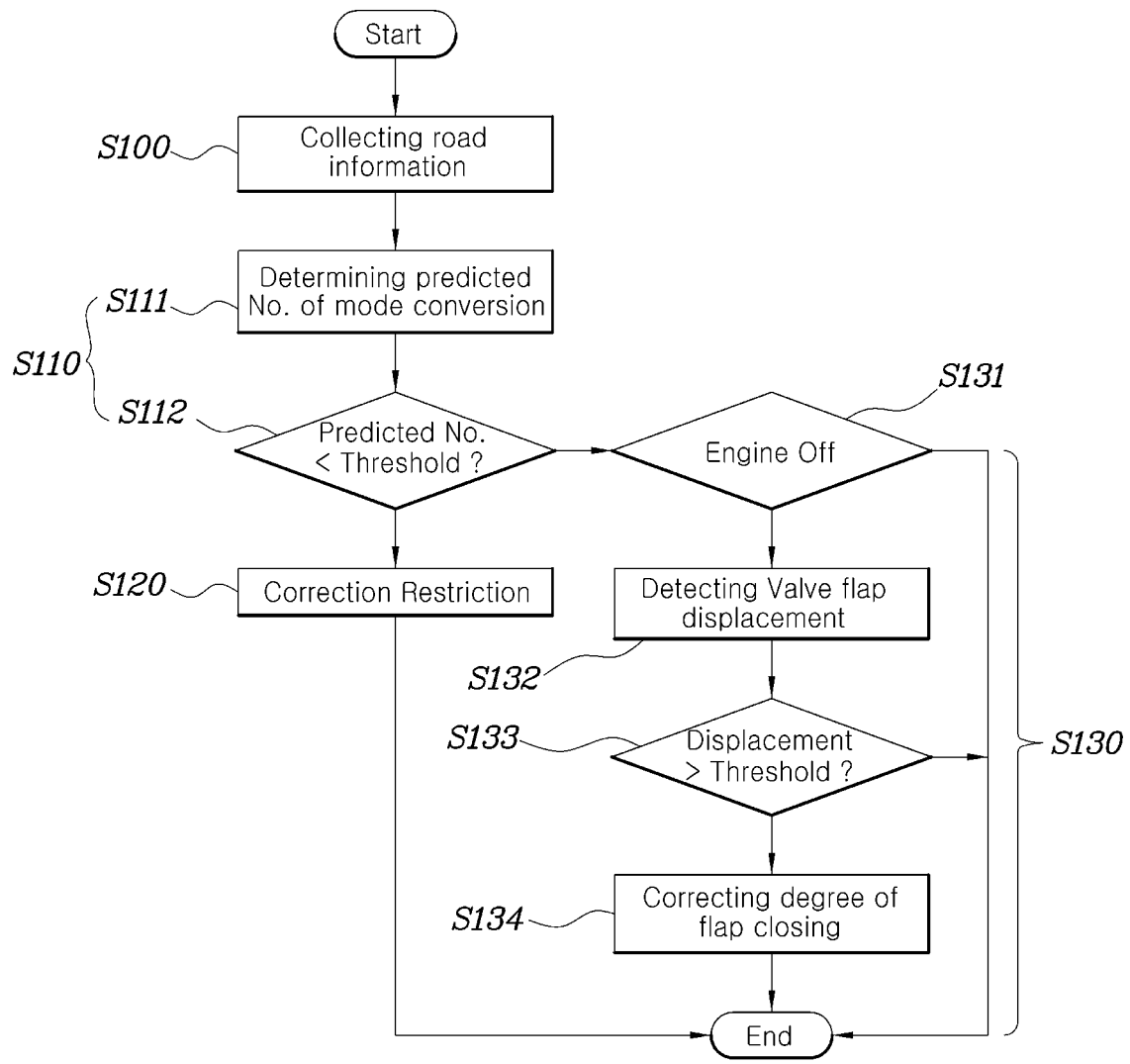

METHOD AND SYSTEM FOR CONTROLLING HYBRID VEHICLE

CROSS REFERENCE TO RELATED APPLICATION(S)

This application claims the benefit of Korean Patent Application No. 10-2015-0086108, filed on Jun. 17, 2015, which is hereby incorporated by reference in its entirety into this application.

BACKGROUND

1. Field of the Invention

The present invention relates to a method and system for controlling a hybrid vehicle, and more particularly, to a method and system for reducing exhaust gas from a hybrid vehicle in a controlled manner.

2. Description of the Related Art

An air control valve (ACV) is a device commonly used for diesel engines in fuel-injected vehicles to combust injected fuels at or around a theoretically ideal air fuel ratio by measuring and adjusting air flow into combustion chambers. Functioning as a throttle flap of a diesel engine, an ACV blocks air inflow the engine is turned off to prevent dieseling and thus to reduce engine vibration. Additionally, an ACV forces the reduction of air intake upon exhaust gas recirculation to introduce exhaust gas recirculation (EGR) gas into an intake manifold. Further, an ACV has the function of adjusting air intake to adjust combustion temperatures to prevent catalyst devices such as a diesel particulate filter (DPF) from being damaged.

However, a conventional ACV is problematic in that when various incompletely combusted materials within exhaust gas are introduced into an intake manifold by EGR, some volatile organic compounds (VOCs) in the combusted material are attached onto the ACV to continually narrow the influx zone. In this condition, electronic control unit (ECU) mapping in consideration of the expected exhaust gas amount as a default may increase the exhaust gas level beyond a threshold level.

Accordingly, whenever the engine is turned off, multiple cycles of ACV opening and closing are performed to trap the attached, incompletely combusted materials or to adjust the closing degree of the valve. Unlike general diesel vehicles, diesel-hybrid vehicle engines frequently stop and restart based on road conditions and driving mode. The opening and closing of the ACV whenever the vehicle frequently stop may result in the generation of excessive noise and the reduction of the ACV in durability.

The matters described as the background arts are merely intended to increase the understanding of the background of the present invention, but should not be recognized as being prior arts which are already known to those skilled in the art.

SUMMARY

Accordingly, the present invention provides a method for controlling a hybrid vehicle, comprising selectively correcting an air control valve as needed, whereby the correction of the air control valve can be prevented from being frequently repeated.

Accordingly, the present invention provides a method and system for controlling a hybrid vehicle installed with an air control valve, comprising: collecting road information; determining a number of conversions between an engine operation mode and a motor driving mode based on the collected road information; restricting a correction of a degree of flap closing of the air control valve when the predicted number of conversions is less than a predetermined threshold; and correcting the air control valve for flap displacement at flap closure when the predicted number of conversions is greater than the predetermined threshold, wherein the degree of flap closing of the air control valve is corrected based on the detected flap displacement.

In one exemplary embodiment of the present invention, the road information is received by a navigation system installed within the vehicle. In addition, the road information may include information regarding speed limits for the road on which the vehicle is traveling, and the number of mode conversion may be determined based on the received information on speed limit, and a vehicle driving mode predetermined by speed.

In another exemplary embodiment of the present invention, the road information may include information regarding speed limits for the road on which the vehicle is traveling, and the number of mode conversion may be determined based on the received information on speed limit, and a vehicle driving mode predetermined by speed. The number of mode conversions may be determined to be a possible number within a predetermined distance from the vehicle. The connection process may be executed when the engine is turned off by adjusting a degree of flap closing when the degree of flap closing fluctuates beyond a threshold preset from a predetermined normal value when the air control valve is closed.

As described herein, the method for controlling a hybrid vehicle in accordance with the present invention allows for selectively adjusting the operation of air control valves as needed, thereby preventing the occurrence of noise generation and a reduction in durability.

BRIEF DESCRIPTION OF THE DRAWINGS

The above and other objects, features and advantages of the present invention will be more clearly understood from the following detailed description taken in conjunction with the accompanying drawings, in which:

FIG. 1 is a flow chart illustrating a method for controlling a hybrid vehicle in accordance with an exemplary embodiment of the present invention.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the tem) "about."

The control of a hybrid vehicle in accordance with an exemplary embodiment of the present invention will be described in detail in conjunction with the accompanying drawing. With reference to FIG. 1, a flow chart illustrates a method for controlling a hybrid vehicle in accordance with an exemplary embodiment of the present invention. The method as described herein below may be executed by a controller having a memory and a processor.

As shown in FIG. 1, an aspect of the present invention provides a method and system for controlling a hybrid vehicle equipped with an air control valve, comprising collecting various road information (S100); determining a number of conversions between an engine operation mode and a motor driving mode (S110), based on the collected road information; restricting a correction (S120) of a degree of flap closing of the air control valve when the predicted number of conversions is less than a predetermined threshold; and correcting (S130) the air control valve for flap displacement at flap closure when the predicted number of conversions is greater than the predetermined threshold and in which the degree of flap closing of the air control valve may be adjusted based on the detected flap displacement.

In one exemplary embodiment of the present invention, the hybrid vehicle may be driven by both a diesel engine and an electric motor. The engine operation mode may be an operation mode driven by an engine alone or in combination with a motor. Further, the motor driving mode may include all driving modes exclusive of engine operation.

In another exemplary embodiment of the present invention, the road information may be received by a navigation system installed within the vehicle. The navigation system may be a navigator installed within the vehicle or may be a system designed to contain or receive information and to provide the information externally (e.g., an external navigation system not integrated into the vehicle). Accordingly, information regarding a road on which the vehicle is traveling or will travel, for example, information regarding straight or curved sections of the road, information regarding speed restrictions by road section, information regarding speed limits on the road, etc. may be received from the navigation system in the data collection process (S100).

In particular, information regarding vehicle speeds may be provided from speed limits preset in the navigation system according to road statuses including lengths, curvatures, and/or slopes of straight or curved sections, from stored data of average vehicle speeds in each of predetermined multiple road sections, and/or by receiving real-time traffic information regarding the road and/or legally enforced speed limits. Other various routes and modalities may be utilized for providing information regarding speeds at which the vehicle is permitted to travel on a road.

In the determination process (S110), a number of the mode conversion may be predicted based on the information received regarding the road information, regarding speeds at which the vehicle may travel on the road, and the vehicle driving mode predetermined based on vehicle speed. In particular, multiple modes that may be operated according to vehicle speed may be set. For example, the vehicle may be operated in a motor driving mode at a speed of less than about 30 km/h, in a hybrid driving mode where a motor and an engine are partially operated in combination at a speed of about 30~60 km/h, and in an engine operation mode when the engine is operated alone at a speed of greater than about 60 km/h. The vehicle may be set to travel in the two modes, that is, a motor driving mode and an engine operation mode,. This is also an exemplary embodiment, and various options for driving modes according to vehicle speed may be given.

In the determination process (S110), information regarding speeds at which the vehicle will travel by road section may be obtained from the information received in the road information collection process (S100), and then may be matched with driving modes according to road section. From the matched modes, a number of conversions from engine operation mode to motor driving mode and vice versa, and from engine operation mode to hybrid operation mode and vice versa may be calculated whereby a number of mode conversions in the road on which the vehicle will travel may be predicted (S111).

In the determination process (S110), the number of mode conversions possible within a predetermined distance from the vehicle may be predicted (S111). Further, the number of mode conversions predicted within the predetermined distance may be compared with the predetermined threshold (S112). When the number of the mode conversions predicted within the predetermined distance is less than the threshold, correction may be anticipated against an excessive degree of flap closing, and thus the correction restricting process (S120) may be executed. The distance may be determined depending on the designer's intention.

Furthermore, when the predicted number of the mode conversions is greater than the threshold, incompletely combusted materials (e.g., soot) or VOCs may be more likely to adhere between a peri-flap and a pipe conduit of the air control valve due to increased acceleration. Accordingly, the correction (e.g., adjustment) process (S130) may be executed as fluctuation in the degree of flap closing is apt to increase with the adherence of soot. When the degree of flap closing fluctuates, a difference between pre-recognized initial close and practical close states of the flap may occur in adjusting flap opening and closing, which may result in inaccurately regulating air inflow. In the correction process (S130), the degree of flap closing may be adjusted to square the practical flap closure state with the pre-recognized value (S134).

Additionally, in the correction process (S130), whether the engine is turned off may first be determined (S131). In particular, when the engine operation is off, the flap may be repetitively opened and closed to trap or remove the incompletely combusted materials attached to the air control valve, after which a degree of valve closing may be detected upon the closure of the air control valve (S132). The degree of flap closing may be a degree of flap opening detected by the valve under the condition of flap closure. Then, whether the degree of flap closing upon the closure of the air control valve exceeds the threshold set from a predetermined normal value may be determined (S133). When the degree of flap closing fluctuates beyond the threshold, the degree of flap closing may be adjusted (S134). For example, when the degree of flap closing is detected to be 2 under the condition of a normal value of 0 with the threshold set to be 1, the flap, although closed in practice, may be recognized to open to a degree of 2. Since the flap may be detected to be open due to the attached incompletely combusted materials, this false diagnosis may be corrected into the normal value to adjust the opening and closing of the flap.

It should be understood that the threshold number, the normal value, and the threshold displacement may vary depending on the designer's intension. As described herein, the method for controlling a hybrid vehicle in accordance with the present invention allows for selectively correcting the operation of air control valves as needed, thereby preventing the occurrence of noise generation and durability reduction.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for controlling a hybrid vehicle, comprising:
    collecting, by a controller, road information of a road on which the vehicle is traveling;
    determining, by the controller, a predicted number of conversions between an engine operation mode and a motor driving mode based on the collected road information;
    comparing, by the controller, the predicted number of conversions with a threshold number of conversions;
    if the predicted number of conversions is less than the threshold number of conversions, restricting, by the controller, a correction of a degree of opening and closing of a flap of an air control valve when an engine is being turned off; and
    if the predicted number of conversions is greater than the threshold number of conversions, adjusting, by the controller, the air control valve for flap displacement upon closing of the flap when the degree of flap closing exceeds a threshold preset from a predetermined normal value, wherein the degree of flap closing of the air control valve is corrected based on the detected flap displacement.

2. The method of claim 1, wherein the road information is received by a navigation system installed within the vehicle.

3. The method of claim 1, wherein the road information includes information regarding speed limits for the road on which the vehicle is traveling, and the number of mode conversions is predicted based on the received information regarding speed limit, and a vehicle driving mode predetermined by speed.

4. The method of claim 1, wherein the road information includes information regarding speed limits for the road on which the vehicle is traveling, and the number of mode conversions is predicted based on the received information regarding speed limit, and a vehicle driving mode predetermined by speed.

5. The method of claim 1, wherein the number of mode conversions is predicted to be a possible number within a predetermined distance from the vehicle.

6. The method of claim 1, wherein the adjustment process is executed when the engine is turned off.

7. A system for controlling a hybrid vehicle, comprising:
    a memory configured to store program instructions; and
    a processor configured to execute the program instructions, the program instructions when executed configured to:
        collect road information of a road on which the vehicle is traveling;
        determine a predicted number of conversions between an engine operation mode and a motor driving mode based on the collected road information;
        compare the predicted number of conversions with a threshold number of conversions;
        if the predicted number of conversions is less than the threshold number of conversions, restrict a correction of a degree of opening and closing of a flap of an air control valve when an engine is being turned off; and
        if the predicted number of conversions is greater than the threshold number of conversions, correct the air control valve for flap displacement upon closing of the flap when the degree of flap closing exceeds a threshold preset from a predetermined normal value, wherein the degree of flap closing of the air control valve is corrected based on the detected flap displacement.

8. The system of claim 7, wherein the road information is received by a navigation system installed within the vehicle.

9. The system of claim 7, wherein the road information includes information regarding speed limits for the road on which the vehicle is traveling, and the number of mode conversions is predicted based on the received information regarding speed limit, and a vehicle driving mode predetermined by speed.

10. The system of claim 7, wherein the road information includes information regarding speed limits for the road on which the vehicle is traveling, and the number of mode conversions is predicted based on the received information regarding speed limit, and a vehicle driving mode predetermined by speed.

11. The system of claim 7, wherein the number of mode conversions is predicted to be a possible number within a predetermined distance from the vehicle.

12. The system of claim 7, wherein the correction process is executed when the engine is turned off.

* * * * *